United States Patent Office.

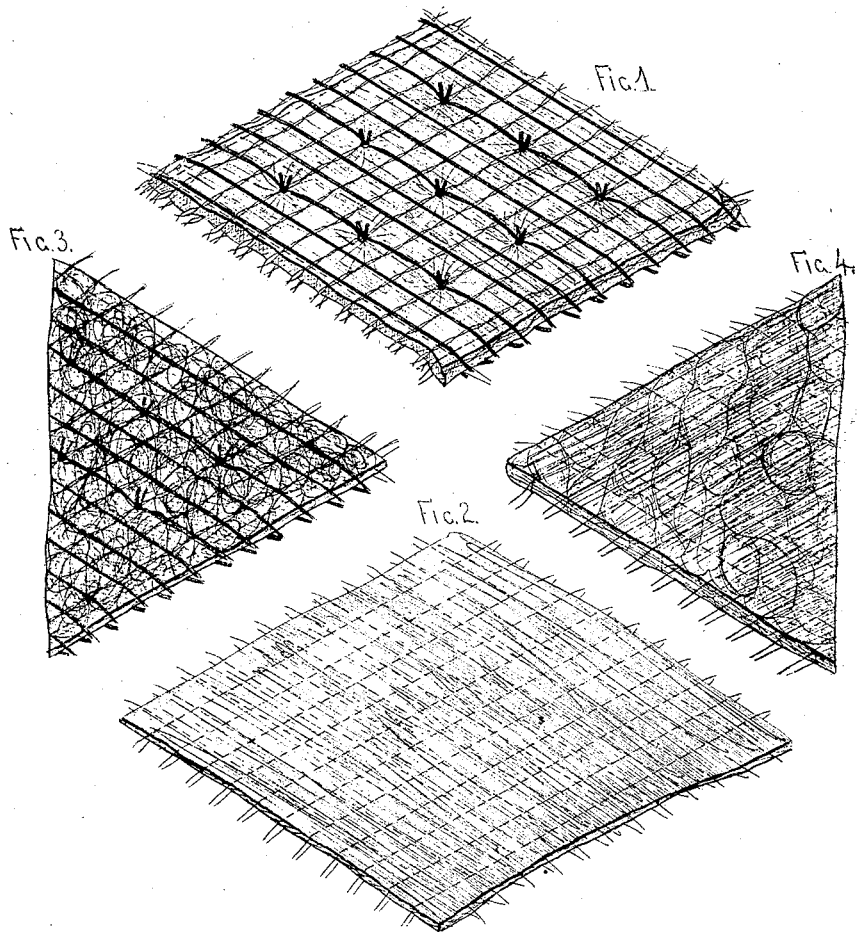

ANTHONY PEPLE, OF BILLERICA, MASSACHUSETTS.

Letters Patent No. 108,821, dated November 1, 1870.

IMPROVEMENT IN PREPARING COTTON-WASTE FOR CLEANING MACHINERY

The Schedule referred to in these Letters Patent and making part of the same.

I, ANTHONY PEPLE, of Billerica, in the county of Middlesex and State of Massachusetts, have invented a new and useful Mode of Utilizing Cotton-Waste for Cleaning Machinery, of which the following is a specification.

In Letters Patent No. 99,945, dated February 15, A. D. 1870, granted me by the United States, I claimed "utilizing cotton or other waste material by inclosing it in a woven or porous bag or envelope," but I have since found that there are advantages in merely stitching or quilting the waste or other absorbent material between sheets of woven, knit, or porous fabric or make. Among these advantages are—

First, that when the waste is made into sheets or layers it may be cut into pieces of any required size or shape; for instance, it may be desirable to cut a very narrow strip for use in places where strips of a greater width could not be used.

Second, that the construction is simple, by the method of stitching or quilting.

Still another advantage in having the absorbent material stitched or quilted is that it is less liable to get out of place by matting together and forming into balls.

Figures 1 and 3 represent cotton-waste, or other absorbent material, stitched or quilted between two sheets of woven or porous fabric or make.

Figures 2 and 4 represent layers of cotton-waste, or other absorbent material, stitched or quilted together.

To effect my purpose, I place one or more layers of waste, or batting, or lapping, or waddings, made either by hand or machinery, of suitable thickness, between two sheets (one of said sheets being above and the other beneath) of woven, knit, or porous fabric or make. I then pass stitches through the waste and the said two sheets, or quilt them together, either by hand or machinery.

This invention, like the one before referred to as having been secured by Letters Patent, allows the waste to come in contact with, and absorb and remove oil and dirt, yet confines the waste in a mass, and prevents separation and deposit of lint from it.

The mass of waste between said sheets, when it becomes saturated with oil and dirt, may be washed without separating it from said sheets.

I do not confine myself to the use of cotton-waste as an absorbent material, as various other substances or materials may be used successfully.

Nor do I confine myself to the method of stitching or quilting cotton-waste or other absorbent material between said two sheets, for the same result may be accomplished by stitching, quilting, or fastening by means of threads, or their equivalent, layers of said absorbent material on one or both sides of a single sheet; and the same result may be accomplished by merely stitching, quilting, or fastening together layers of said absorbent material, that is, by stitching said layers to each other.

Nor do I confine myself to the ways hereinbefore mentioned of producing cohesiveness or of preventing or lessening the separation of the fibers or particles of said absorbent materials for cleaning machinery, as other ways may be adopted to produce the same results with advantage, as, for instance, by winding around, or surrounding wholly or partially, or connecting said absorbent material with thread, yarn, or twine, or its equivalent, or by forcing said absorbent material into sheets by felting, or into roping or roving, or its equivalent, and making said roping or roving into a fabric; or said roving may be strengthened by being covered with sizing, or by being connected with thread, yarn, twine, or its equivalent, so that the said roping or roving may be formed into a fabric.

I do not, in this application, claim utilizing cotton or other waste material by inclosing it in a woven or porous bag or envelope, as that invention is covered by said Letters Patent No. 99,945, hereinbefore referred to.

I claim as my invention—

1. Utilizing cotton-waste, or other absorbent materials or substances, by stitching or quilting layers of the same between sheets of woven, knit, or porous fabric or make, substantially in the manner and for the purpose herein set forth.

2. Utilizing cotton-waste, or other absorbent material, by stitching together layers of the same, substantially in the manner and for the purpose herein set forth.

3. The use of cotton-waste, or other absorbent materials, in connection with any form of knit, woven, or porous fabric or make, for the purpose herein set forth.

4. Producing cohesiveness or preventing or lessening the separation of portions or particles, or fibers of cotton-waste, or other absorbent materials, substantially as described, and for the purpose herein set forth.

ANTHONY PEPLE.

Witnesses:
ABEL T. ATHERTON,
SAML. P. RUSSELL.